(12) United States Patent
Tsirkin et al.

(10) Patent No.: US 8,990,803 B2
(45) Date of Patent: Mar. 24, 2015

(54) VIRTUAL MEDIA SHELF

(75) Inventors: Michael S. Tsirkin, Yokneam Yillit (IL); Gleb Natapov, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 141 days.

(21) Appl. No.: 13/149,009

(22) Filed: May 31, 2011

(65) Prior Publication Data

US 2012/0311567 A1 Dec. 6, 2012

(51) Int. Cl.
*G06F 9/455* (2006.01)

(52) U.S. Cl.
CPC .. *G06F 9/45558* (2013.01); *G06F 2009/45579* (2013.01)
USPC ............................................................ 718/1

(58) Field of Classification Search
CPC ........ G06F 9/455; G06F 9/5077; G06F 9/445
USPC ............................................................ 718/1
See application file for complete search history.

(56) References Cited

U.S. PATENT DOCUMENTS

2009/0235358 A1* 9/2009 Tolba ............................... 726/24

OTHER PUBLICATIONS

Wikipedia, Virtual Machine, May 28, 2010, http://en.wikipedia.org, Section 1.2 Process virtual machines.*

* cited by examiner

*Primary Examiner* — Emerson Puente
*Assistant Examiner* — Steven Do
(74) *Attorney, Agent, or Firm* — Lowenstein Sandler LLP

(57) ABSTRACT

A method and system for providing a guest with virtual media that can be read by the guest with an emulated media drive. A hypervisor hosted by a computer system presents a guest-to-host channel to a guest in the computer system. The hypervisor receives content from the guest via the guest-to-host channel, and then receives a request from the guest indicating that the guest is to read the content. The hypervisor provides the content for the guest to read by emulating a media drive and an insertion of removable virtual media. The removable virtual media contains the content and is readable by the guest with the emulated media drive.

20 Claims, 4 Drawing Sheets

VIRTUAL MEDIA SHELF

TECHNICAL FIELD

Embodiments of the present invention relate to a computer system, and more specifically, to data management in a virtual machine system.

BACKGROUND

Virtualization allows multiplexing of an underlying host machine between different virtual machines. The host computer allocates a certain amount of its resources to each of the virtual machines. Each virtual machine is then able to use the allocated resources to execute applications (referred to as a guest), including an operating system (referred to as a guest operating system) that runs on the virtual machine.

A guest in a virtual machine system is allocated with virtual disk space. Instead of using the virtual disk space to store contents that the guest may later use, the guest may pass the contents to the host (e.g., a hypervisor) and the host may store the contents in host storage space. One approach for passing contents between a guest and a hypervisor is to add a guest driver to the guest, such that the guest driver can read and write the contents from/to a host location. However, adding a guest driver to the guest means modifying the guest with customized code. Writing the customized code can be error-prone and time-consuming.

Further, a custom-coded guest driver needs to be tailored to each guest operating environment, and installation of the custom-coded guest driver can have different degrees of difficulty in different guest operating environments. For example, it can be easier to install a custom driver in a main guest operating system, and more difficult to install this driver in an early-boot BIOS environment. Additionally, specific applications may need to be written to work with a specific media type. For example, an audio player may only work with an audio CDROM type of media. Thus, multiple applications will need to be written to work with different media types. These myriads of considerations make it difficult to provide a custom-coded guest driver in each guest.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
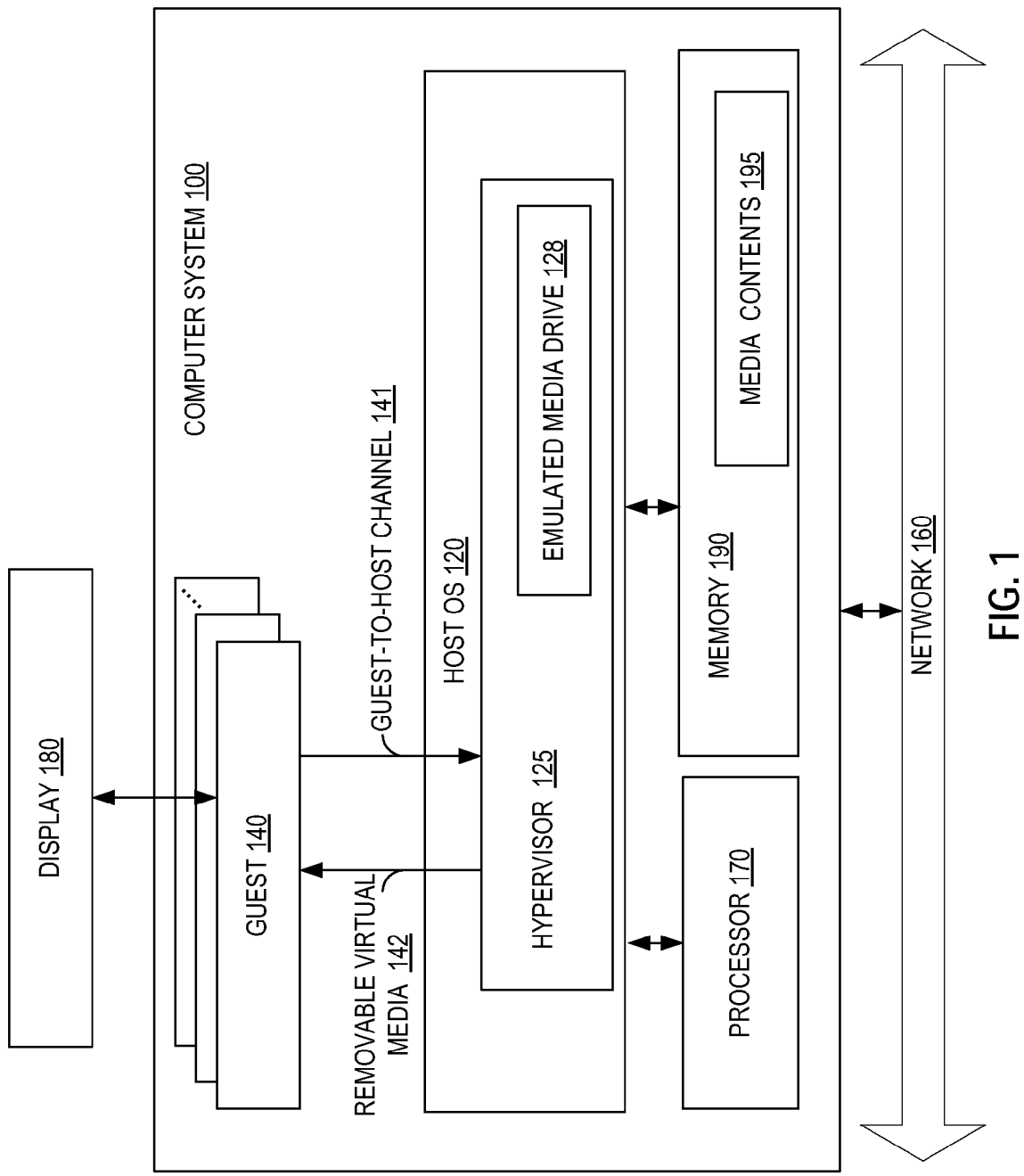
FIG. 1 is a block diagram illustrating one embodiment of a virtual machine system in which a guest passes content to a hypervisor via a guest-to-host channel and reads the content using an emulated media drive.

Described herein is a method and system for providing a guest with virtual media that can be read by the guest with an emulated media drive. In one embodiment, a hypervisor hosted by a computer system presents a guest-to-host channel to a guest in the computer system. The hypervisor receives content from the guest via the guest-to-host channel, and then receives a request from the guest indicating that the guest is to read the content. The hypervisor provides the content for the guest to read by emulating a media drive and an insertion of removable virtual media. The removable virtual media contains the content and is readable by the guest with the emulated media drive.

Throughout the following description, the term "guest" refers to the software that runs, or can run on a hypervisor. A guest can be installed on a disk, loaded into memory, or currently running. A guest may include one or more of the following: a firmware copy in memory, an operating system, additional installed software, a browser, applications running on the browser, etc. The term "virtual machine" (VM) refers to part of a hypervisor and the host system running the hypervisor that are visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

Embodiments of the invention allow a guest to create a read-only memory area in the host system without occupying the guest virtual disk, and to read contents from this area without a custom-coded guest driver. The contents may be files, applications, images, etc, which may be downloaded by the guest or generated by the guest. For example, the guest may download an installation disk from the Internet. The guest user may want to boot the guest from the disk or use a partitioning tool on the disk. According to embodiments of the invention, the guest can pass this downloaded content to the host via a guest-to-host channel, and can read back the content using an emulated media drive that reads the content from an emulated media disk. In one embodiment, the guest-to-host channel may be emulated by a hypervisor of the computer system with an insertion of a blank media disk and a media writer. The guest may use the media writer to write the content to the blank media disk, thereby passing the content to the hypervisor. In a scenario where the content is a downloaded operating system (OS) image, a guest administrator can reboot the guest using the downloaded OS image by having the guest pass the OS image to the hypervisor and then read back the OS image from an emulated media disk, without any involvement of the host administration.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an embodiment of a computer system 100 in which embodiments of the present invention may operate. The computer system 100 hosts a plurality of guests (e.g., guest 140), each of which runs a guest operating system to manage its resources. The guests may run the same or different guest operating systems, such as Microsoft Windows®, Linux®, Solaris®, Mac® OS, etc. The computer system 100 can be a server computer or a number of server computers.

In one embodiment, the computer system 100 runs a hypervisor 125 to virtualize access to the underlying host hardware (e.g., one or more processor 170 and memory 190, etc) for the guest 140 and the user of the guest 140. The hypervisor 125 is also known as a virtual machine monitor (VMM), a kernel-based hypervisor, or a host operating system 120. The hypervisor 125 presents to the guest 140 emulated hardware and software components, such that the specifics of host (i.e., the computer system 100) is hidden from the guest 140 and its user. Operations of the hypervisor 120 are executed by the one or more processors 170 of the computer system 100. Although one processor is shown in FIG. 1, it is understood that the computer system 100 can include any number of processors.

In one embodiment, the computer system 100 is accessible by remote systems via a network 160. The network 160 may be a private network (e.g., a local area network (LAN), a wide area network (WAN), intranet, etc.) or a public network (e.g., the Internet).

According to one embodiment, the hypervisor 125 presents a guest-to-host channel 141 to the guest 140, which allows the guest 140 to pass guest contents to the hypervisor 125. The guest contents can be files, applications, images, etc., downloaded by the guest 140 or generated by the guest 140. The hypervisor 125 stores the guest contents passed from the guest 140 as media contents 195 in the memory 190 or other storage devices, such as disks, flash drives, etc. In one embodiment, the guest 140 can process the guest contents before passing the processed contents to the hypervisor 125, and the hypervisor 125 can post-process the contents to restore the guest contents. For example, the guest 140 can compress an image and pass the compressed image to the hypervisor 125. The hypervisor can decompress the image and store the decompressed image, or store the compressed image and then decompress the image when it reads back the image.

When the guest 140 or a guest user wishes to read back one or more of the media contents 195, the hypervisor 125 retrieves the media contents 195 and emulates the insertion of removable virtual media 142. Techniques for emulating media insertion are well-known. For example, a guest can query an emulated ROM device for media presence periodically, and a hypervisor can trap this request and respond with information about the emulated media. The removable virtual media 142 contains the media contents 195 that the guest 140 or the guest user wishes to read. In one embodiment, the hypervisor 125 emulates the removable virtual media 142 with a storage location (e.g., memory or registers) in the computer system 100. Upon receiving an indication from the hypervisor 125 that the removable virtual media has been inserted, the guest 140 reads the content of the removal virtual media 142 using an emulated CD drive 128. In one embodiment, the removal virtual media 142 is read-only by the guest 140.

Throughout the description, the term "media" is used to refer to a storage media that can be inserted into and removed from a computer system. Examples of the media include a compact disk (CD), digital versatile disk (DVD), super density (SD) disk, portable flash drive, a removable storage device (e.g., disk on key), etc.

In one embodiment, the computer system 100 is coupled to a display 180 which presents a user interface (e.g., a graphical user interface (GUI)) to the guest user. Through the GUI, the guest user can view what media contents (e.g., files, applications, images, etc.) have been previously passed to the hypervisor 142. The guest user can select any of the media contents for use by the guest 140. The guest 140 sends a request (or command) to the hypervisor 125, indicating the selected content. The hypervisor 125 traps this request (or command) and emulates the insertion of the removal virtual media 142 that contains the selected content.

Embodiments of the invention create a "virtual media shelf" in the host system for use by the guest 140. This "virtual media shelf" includes a collection of virtual media that contains the media contents of the guest 140 and is managed by the hypervisor 125. The virtual media does not occupy the guest's virtual memory or disk space. At any given time, the guest 140 can read back the media content using the emulated media drive 128 provided by the hypervisor 125, using a standard guest driver for the specific device without a custom-coded guest driver.

Figure 2:
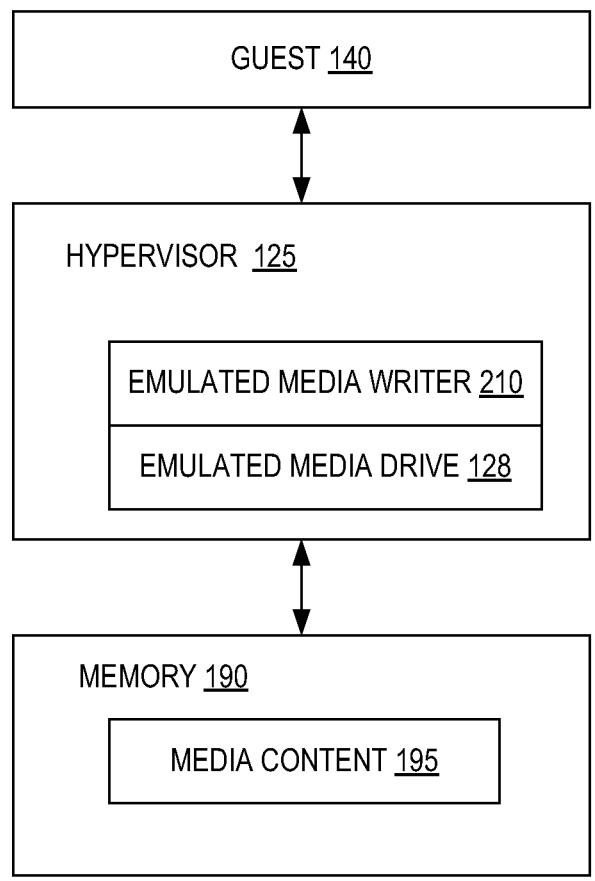
FIG. 2 is a block diagram illustrating one embodiment of a guest-to-host channel.

FIG. 2 is a block diagram that illustrates an embodiment of the guest-to-host channel 141. In this embodiment, the hypervisor 125 includes an emulated media writer 210 in additional to the emulated media drive 128. When the guest 140 passes content to the hypervisor 125, the guest 140 can use this emulated media writer 210 to write into a storage location (e.g., memory or registers) that is presented to the guest 140 as a "blank media disk" being inserted into the computer system 100. Writing the content (with the emulated media writer 210) into this "blank media disk" is equivalent to transferring the content to the hypervisor 125. The guest 140 may repeatedly pass contents to the hypervisor 125 using the emulated media writer 210.

Figure 3:
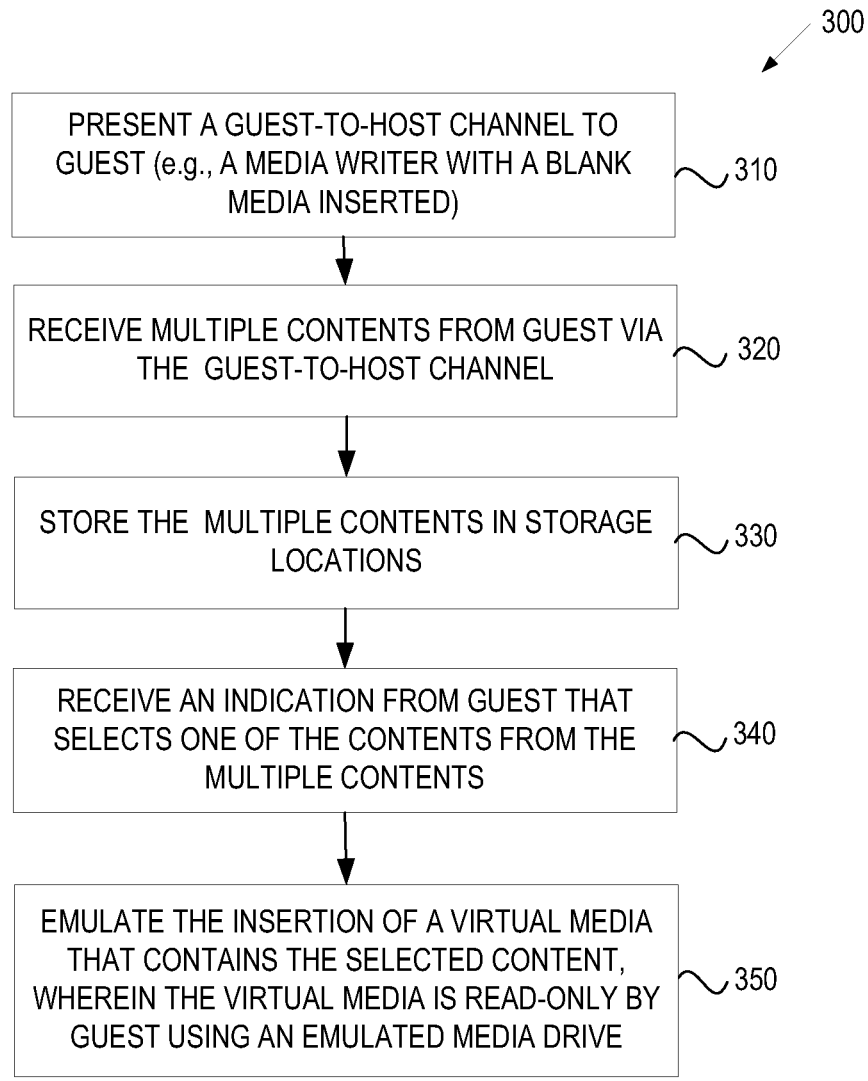
FIG. 3 is a flow diagram of one embodiment of a method for a guest to pass a content to a hypervisor via a guest-to-host channel and read the content using an emulated media drive.

FIG. 3 is a flow diagram illustrating one embodiment of a method 300 for a guest to pass contents to a hypervisor and to read back the contents. The method 300 may be performed by a computer system 400 of FIG. 4 that may comprise hardware (e.g., circuitry, dedicated logic, programmable logic, microcode, etc.), software (e.g., instructions run on a processing device), or a combination thereof. In one embodiment, the method 300 is performed by the hypervisor 125 of FIG. 1 and FIG. 2.

Referring to FIG. 3, in one embodiment, the method 300 begins when the hypervisor 125, upon startup of the guest 140 or by the request of the guest 140, presents the guest-to-host channel 141 to the guest 140 (block 310). In one embodiment, the guest-to-host channel 141 is emulated by the hypervisor 125 with the insertion of a blank media disk and the media writer 210 that can be used by the guest 140 to write into the blank media disk. The hypervisor 125 receives one or more contents from the guest via the guest-to-host channel 141 (block 320). The hypervisor 125 stores the contents in storage locations managed by the hypervisor 125 (block 330). Subsequently, the hypervisor 125 receives a request from the guest (or the guest user), indicating that one of the contents has been selected for use by the guest 140 (block 340). The hypervisor 125 then emulates the insertion of the removable virtual media 142 containing the selected content (block 350). The virtual media 142 is read-only by the guest, and can be read by the guest 140 using the emulated media drive 128.

In one embodiment, the hypervisor 125 can post-process the contents from the guest (e.g., decompression, encryption or decryption, etc.). The hypervisor 125 can post-process the contents after it receives the contents from the guest and before it stores the contents (i.e., after block 320 and before block 330). Alternatively, the hypervisor 125 can post-process the contents after it receives the request from the guest (or the guest user) and before it emulates the media insertion (i.e., after block 340 and before block 350).

Figure 4:
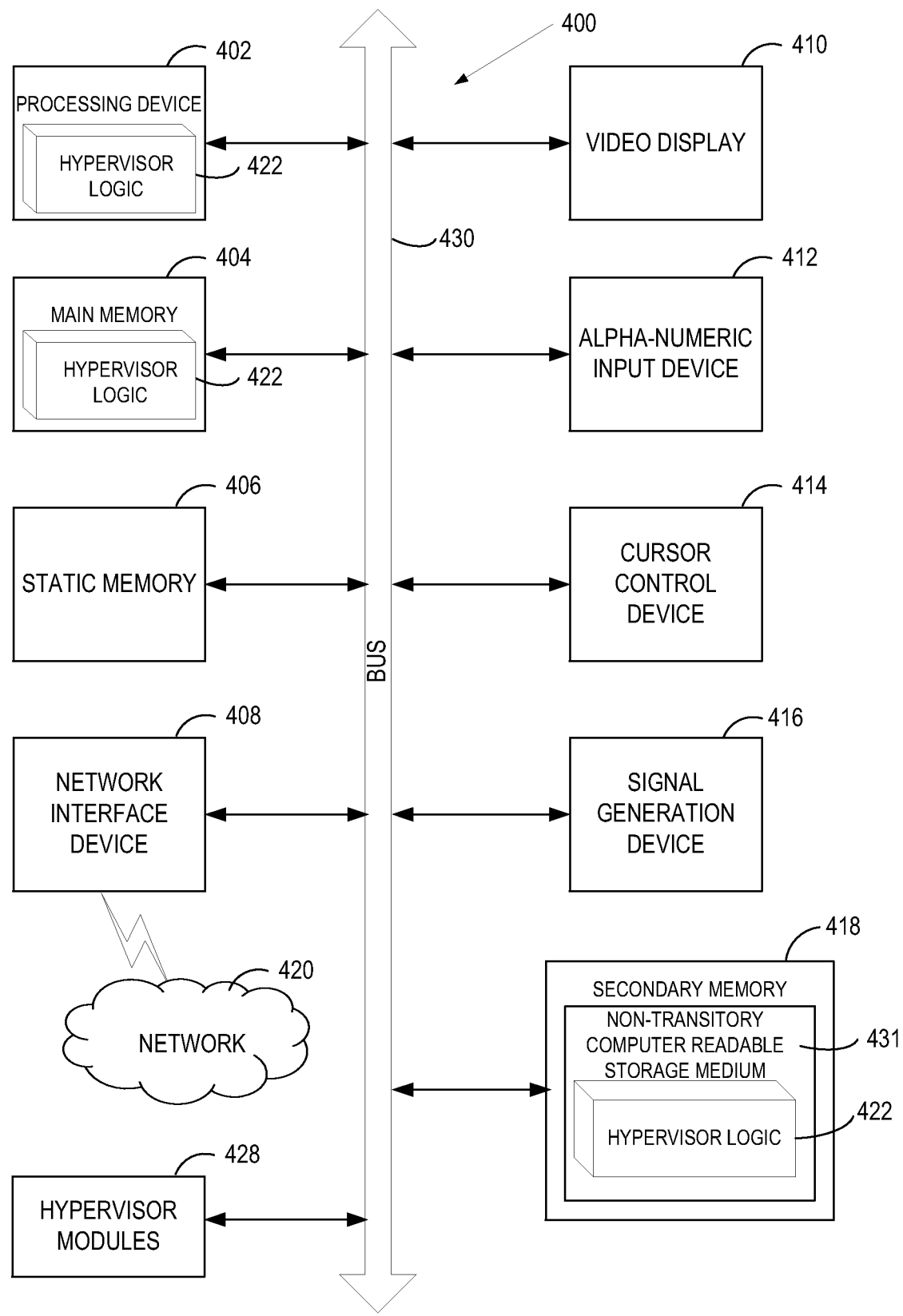
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute hypervisor logic 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a non-transitory computer readable storage medium 431) on which is stored one or more sets of instructions (e.g., hypervisor logic 422) embodying any one or more of the methodologies or functions described herein (e.g., the hypervisor 125 of FIGS. 1 and 2). The hypervisor logic 422 may also reside, completely or at least partially, within the main memory 404 and/or within the processing device 402 during execution thereof by the computer system 400; the main memory 404 and the processing device 402 also constituting machine-readable storage media. The hypervisor logic 422 may further be transmitted or received over a network 420 via the network interface device 408.

The non-transitory computer readable storage medium 431 may also be used to store the hypervisor logic 422 persistently. While the non-transitory computer readable storage medium 431 is shown in an exemplary embodiment to be a single medium, the term "non-transitory computer readable storage medium" should be taken to include a single medium or multiple media (e.g., a centralized or distributed database, and/or associated caches and servers) that store the one or more sets of instructions. The term "non-transitory computer readable storage medium" shall also be taken to include any medium that is capable of storing or encoding a set of instructions for execution by the machine that causes the machine to perform any one or more of the methodologies of the present invention. The term "non-transitory computer readable storage medium" shall accordingly be taken to include, but not be limited to, solid-state memories, and optical and magnetic media.

The computer system 400 may additionally include hypervisor modules 428 for implementing the functionalities of the hypervisor 125 of FIGS. 1 and 2. The module 428, components and other features described herein (for example in relation to FIG. 1) can be implemented as discrete hardware components or integrated in the functionality of hardware components such as ASICS, FPGAs, DSPs or similar devices. In addition, the module 428 can be implemented as firmware or functional circuitry within hardware devices. Further, the module 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "presenting," "receiving," "providing," "emulating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a computer system, comprising:
   presenting, by a hypervisor hosted by the computer system, a guest-to-host channel to a guest of a plurality of guests running on the computer system, the guest having a guest virtual disk, each of the plurality of guests comprising a guest operating system;
   receiving, by the hypervisor, content from the guest via the guest-to-host channel, wherein the guest running on the computer system does not intend to store the content on the guest virtual disk, the content to be stored and managed by the hypervisor in a memory area associated with the guest in the computer system, the guest having no direct access to the memory area;
   receiving, by the hypervisor, a request from the guest indicating that the guest is to perform at least one operation on the content; and
   providing, by a processing device executing the hypervisor, the content for the guest to perform the at least one operation, wherein providing the content for the guest comprises emulating a media drive and an insertion of removable virtual media, the removable virtual media containing the content and being accessible to the guest via the media drive.

2. The method of claim 1, further comprising:
   emulating, by the hypervisor, the guest-to-host channel with an insertion of a blank media disk and a media writer, the media writer being used by the guest to write the content to the blank media disk.

3. The method of claim 2, wherein the blank media disk is emulated by the hypervisor with a storage location in the computer system.

4. The method of claim 1, further comprising:
   receiving multiple contents from the guest via the guest-to-host channel; and
   receiving an indication from the guest that selects the content from the multiple contents.

5. The method of claim 1, wherein the removable media disk is read-only by the guest.

6. The method of claim 1, wherein the removable virtual media is emulated by the hypervisor with a storage location in the computer system.

7. The method of claim 1, further comprising:
   processing, by the hypervisor, the content from the guest before providing the content for the guest to read.

8. A system comprising:
   a memory to store content that is passed from a guest of a plurality of guests running on a computer system to a hypervisor of the computer system, each of the plurality of guests comprising a guest operating system; and
   a processor coupled to the memory to execute operations of the hypervisor, the processor operable to:
   present a guest-to-host channel to the guest running on the computer system, the guest having a guest virtual disk;
   receive content from the guest via the guest-to-host channel, wherein the guest running on the computer system does not intend to store the content on the guest virtual disk, the content to be stored and managed by the hypervisor in a memory area associated with the guest in the computer system, the guest having no direct access to the memory area;
   receive a request from the guest indicating that the guest is to perform at least one operation on the content; and
   emulate a media drive and an insertion of removable virtual media to provide the content for the guest to perform the at least one operation, wherein the removable virtual media contains the content and is accessible to the guest via the media drive.

9. The system of claim 8, wherein the guest-to-host channel is emulated with an insertion of a blank media disk and a media writer, the media writer being used by the guest to write the content to the blank media disk.

10. The system of claim 8, wherein the blank media disk is emulated with a storage location in the computer system.

11. The system of claim 8, wherein the hypervisor is operative to
    receive multiple contents from the guest via the guest-to-host channel, and
    receive an indication from the guest that selects the content from the multiple contents.

12. The system of claim 8, wherein the removable media disk is read-only by the guest.

13. The system of claim 8, wherein the removable virtual media is emulated with a storage location in the computer system.

14. A non-transitory computer readable storage medium having stored therein instructions that, when executed by a computer system, cause the computer system to perform a method comprising:
    presenting, by a hypervisor hosted by the computer system, a guest-to-host channel to a guest of a plurality of guests running on the computer system, the guest having a guest virtual disk, each of the plurality of guests comprising a guest operating system;
    receiving, by the hypervisor, content from the guest via the guest-to-host channel, wherein the guest running on the computer system does not intend to store the content on the guest virtual disk, the content to be stored and managed by the hypervisor in a memory area associated with the guest in the computer system, the guest having no direct access to the memory area;
    receiving, by the hypervisor, a request from the guest indicating that the guest is to perform at least one operation on the content; and
    providing, by a processing device executing the hypervisor, the content for the guest to perform the at least one operation, wherein providing the content for the guest comprises emulating a media drive and an insertion of removable virtual media, the removable virtual media containing the content and being accessible to the guest via the media drive.

15. The non-transitory computer readable storage medium of claim 14, further comprising:
    emulating, by the hypervisor, the guest-to-host channel with an insertion of a blank media disk and a media writer, the media writer being used by the guest to write the content to the blank media disk.

16. The non-transitory computer readable storage medium of claim 15, wherein the blank media disk is emulated by the hypervisor with a storage location in the computer system.

17. The non-transitory computer readable storage medium of claim 14, further comprising:
  receiving multiple contents from the guest via the guest-to-host channel; and
  receiving an indication from the guest that selects the content from the multiple contents.

18. The non-transitory computer readable storage medium of claim 14, wherein the removable media disk is read-only by the guest.

19. The non-transitory computer readable storage medium of claim 14, wherein the removable virtual media is emulated by the hypervisor with a storage location in the computer system.

20. The non-transitory computer readable storage medium of claim 14, wherein the method further comprises:
  processing, by the hypervisor, the content from the guest before providing the content for the guest to read.

\* \* \* \* \*